(12) United States Patent
Schelkle et al.

(10) Patent No.: US 8,799,520 B2
(45) Date of Patent: Aug. 5, 2014

(54) CONTROLLER AREA NETWORK (CAN) BUS DEVICE WHEREIN EXCUSIVE IDENTIFIERS OF THE STATION IS USED TO BOTH DETECT FOR ERRORS AND DETERMINE WHETHER MESSAGE IS RELEVANT TO THE STATION

(75) Inventors: Guenter Schelkle, Reichenbach/Fils (DE); Vijay Peter Dhanraj, Rüsselsheim (DE); Oscar-Luis Gonzales, Remseck/Pattonville (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 13/379,011

(22) PCT Filed: Jun. 10, 2010

(86) PCT No.: PCT/EP2010/058147
§ 371 (c)(1),
(2), (4) Date: Apr. 26, 2012

(87) PCT Pub. No.: WO2010/145985
PCT Pub. Date: Dec. 23, 2010

(65) Prior Publication Data
US 2012/0210178 A1 Aug. 16, 2012

(30) Foreign Application Priority Data
Jun. 17, 2009 (DE) .......................... 10 2009 026 995

(51) Int. Cl.
*H04L 1/00* (2006.01)
*G06F 11/07* (2006.01)

(52) U.S. Cl.
USPC ............... 710/3; 710/300; 709/224; 709/225; 709/226; 714/25; 714/49; 714/57

(58) Field of Classification Search
USPC ............................. 710/3, 320; 709/224–226
See application file for complete search history.

(56) References Cited

U.S. PATENT DOCUMENTS

| 4,825,204 | A  |   | 4/1989  | Nakamura |
|-----------|----|---|---------|----------|
| 5,283,571 | A  |   | 2/1994  | Yang et al. |
| 6,273,771 | B1 | * | 8/2001  | Buckley et al. ................. 440/84 |
| 6,654,355 | B1 | * | 11/2003 | Marbach et al. ............. 370/285 |
| 7,362,740 | B2 | * | 4/2008  | Fredriksson .................. 370/345 |
| 8,072,877 | B2 | * | 12/2011 | Fredriksson .................. 370/217 |
| 8,392,570 | B2 | * | 3/2013  | Arnold et al. ................ 709/226 |
| 8,509,257 | B2 | * | 8/2013  | Yakashiro .................... 370/421 |

FOREIGN PATENT DOCUMENTS

EP 0 469 812 A1 2/1992

OTHER PUBLICATIONS

International Search Report corresponding to PCT Application No. PCT/EP2010/058147, mailed Aug. 4, 2010, (German and English language document) (4 pages).

* cited by examiner

*Primary Examiner* — Tammara Peyton
(74) *Attorney, Agent, or Firm* — Maginot, Moore & Beck

(57) ABSTRACT

A method for operating a bus system, in particular a CAN bus is disclosed. Several stations can be connected to the bus system. A transmitted message has an identifier, wherein a certain identifier (for example, IDENT) always may be used only by a single station. Each of the stations compares the identifier of a transmitted message with the identifiers the station itself uses (for example, IDENT2). An error message is produced in the event of a match.

7 Claims, 1 Drawing Sheet

CONTROLLER AREA NETWORK (CAN) BUS DEVICE WHEREIN EXCUSIVE IDENTIFIERS OF THE STATION IS USED TO BOTH DETECT FOR ERRORS AND DETERMINE WHETHER MESSAGE IS RELEVANT TO THE STATION

This application is a 35 U.S.C. §371 National Stage Application of PCT/EP2010/058147, filed on Jun. 10, 2010, which claims the benefit of priority to Application Serial No. DE 10 2009 026 995.9, filed on Jun. 17, 2009 in Germany, the disclosures of which are incorporated herein by reference in their entirety.

BACKGROUND

The disclosure relates to a method for the operation of a bus system, particularly what is known as a CAN bus (CAN=controller area network).

In the case of a CAN bus, each transmitted message contains what is known as an identifier. This identifier is used by the stations connected to the CAN bus to decide whether the transmitted message is relevant to them. The identifier is added by the sending station to the user data that are to be transmitted. In this case, each station is able to send any number of messages with different identifiers. Each identifier can be used only by one particular station, however, and one and the same identifier cannot be added to a message by different stations.

A CAN bus is designed such that new stations can be connected without relatively great complexity. Inter alia, this allows an identifier which is already being used by an existing station to be erroneously used by another station, for example one newly added, too.

It is an object of the disclosure to recognize errors in connection with the use of identifiers.

SUMMARY

The disclosure achieves this object by use of a method set forth below.

The disclosure permits a particular identifier only ever to be used by a single station. Each of the stations compares the identifier of a transmitted message with the identifiers which it uses itself. In the event of a match, an error message is produced.

If, therefore, for whatever reasons, any identifier is used by two different stations, the method according to the disclosure is used by one of the two stations to recognize this no later than when the other station first sends the identifier which is already in use as part of a message. The disclosure thus ensures that a message having a particular identifier can only ever come from a single station.

BRIEF DESCRIPTION OF THE DRAWINGS

Further features, opportunities for application and advantages of the disclosure can be found in the description below of exemplary embodiments of the disclosure which are shown in the figures of the drawing. In this context, all features described or shown, separately or in any combination, form the subject matter of the disclosure, regardless of their summary in the patent claims or the back-references therein and also regardless of their wording or illustration in the description or in the drawings.

DETAILED DESCRIPTION

Figure 1:
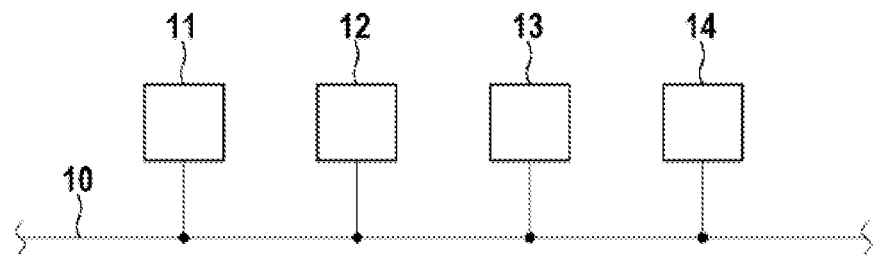
FIG. 1 shows a schematic block diagram of an exemplary embodiment of a bus system according to the invention.

FIG. 1 shows a bus system 10, which may be what is known as a CAN bus (CAN=controller area network), in particular. The bus system 10 in FIG. 1 is in the form of a serial bus system to which, for example, four stations 11, 12, 13, 14 are connected. If the bus system 10 is used in a motor vehicle, for example, the stations 11, 12, 13, 14 may be an engine controller and/or a drive controller or the like, for example.

The stations 11, 12, 13, 14 of the bus system 10 are designed to have equal authorization and are able to send and receive messages 20. The structure of such a message 20 will be described in more detail below with reference to FIG. 2. At one particular time, it is only ever possible for one of the stations 11, 12, 13, 14 to access the bus system 10 and to send its message 20. The message 20 sent can then be received and, where appropriate, processed by all other stations 11, 12, 13, 14.

Figure 2:
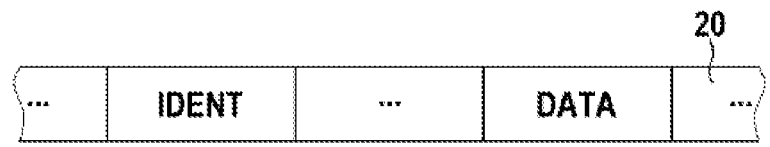
FIG. 2 shows a schematic illustration of a message in the bus system in FIG. 1.

Each message 20 transmitted by the bus system 10 has a prescribed format. FIG. 2 shows a detail from such a message 20. Accordingly, the message 20 contains at least one "identifier" IDENT and the user data for DATA that are to be transmitted. The identifier IDENT and the user data DATA are produced by the sending station. In the case of a CAN bus, the identifier IDENT may be 11 bits or 29 bits long, for example.

Each of the stations 11, 12, 13, 14 is able to send any number of messages 20 with different identifiers IDENT. The nonsending stations then take the identifier IDENT as a basis for deciding whether or not the received message 20 is relevant to them. If the message 20 is relevant to one of the stations 11, 12, 13, 14, the message 20 is read in and processed by this station.

An essential aspect is that a particular identifier IDENT can only ever be sent by a single station. This means that a particular identifier is always an explicit reference to a single particular station. In other words, this means that one and the same identifier IDENT cannot be used by two different stations.

It will now be assumed that the station 11 sends messages with the identifier IDENT1, the station 12 sends messages with the identifier IDENT2 and the station 13 sends messages with the identifier IDENT3. It will also be assumed that the station 14—erroneously—sends messages with the identifier IDENT2. This error cannot be recognized by the stations 11, 13, since, on the basis of the identifier IDENT2, they always assume that the associated message comes from the station 12, that is to say even if it is the—erroneous—message from the station 14.

Figure 3:
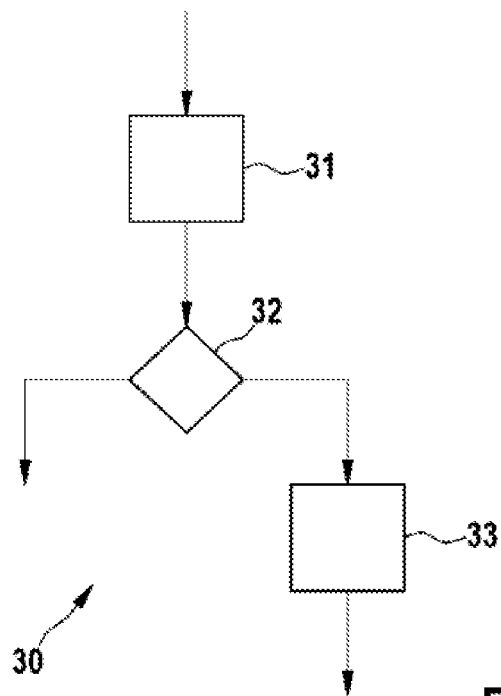
FIG. 3 shows a method for the operation of the bus system in FIG. 1.

For the purpose of recognizing this error, the method shown in FIG. 3 is provided. This method 30 is carried out continuously by each of the stations 11, 12, 13, 14. The basis for the method 30 is a list which is stored in the respective station and which contains all the identifiers IDENT which are used by the respective station and which therefore cannot be used by other stations for sending messages.

The method 30 is explained below with reference to the exemplary scenario explained, in which the station 14 erroneously uses the identifier IDENT2, which can only be used by the station 12.

If the station 12 is in a state in which it is not sending, the station 12 reads in at least the identifier IDENT—in a first step 31—of those messages 20 which are transmitted by other stations via the bus system 10. In a subsequent step 32, the station 12 compares the read-in identifier IDENT with the identifiers stored in its own list. Since, as has been explained, the station 12 uses at least the identifier IDENT2, the list of the station 12 contains at least this identifier IDENT2.

The station 12 therefore compares the identifier IDENT which has been read in by the bus system 10 with the stored identifier IDENT2. If the identifier IDENT which has been read in is the identifier IDENT2 erroneously used by the station 14, the station 12 determines a match with the stored identifier IDENT2.

In this case, the station 12 produces an error message in a step 33 and sends this error message to all other stations via the bus system. This means that the error is known to all stations 11, 12, 13, 14 and can then be rectified by the erroneously acting station 14, for example.

If there is no match, the method 30 is terminated in this respect.

It goes without saying that the station 14 may also be that station which determines the use of the identifier IDENT2 by the station 12. In this case, the station 14 produces the error message in accordance with the step 33 of the method 30. When rectifying the error, it is then first of all necessary to check which station is operating erroneously. It likewise goes without saying that the method 30 in FIG. 3 also comes into play if more than two stations use the same identifiers.

As has been explained, the method 30 is carried out continuously by all stations 11, 12, 13, 14. Each of the stations 11, 12, 13, 14 thus compares the identifier IDENT of a transmitted message 20 with the identifiers IDENTx which it uses itself. If—for whatever reasons—any identifier IDENTx is being used by two different stations, this is recognized by one of the two stations, using the method 30, no later than when the other station first sends the identifier IDENTx already in use as part of a message 20. The error can then be reported and rectified.

Preferably, the method 30 is carried out using a computer program. To this end, the computer program is stored in the individual stations 11, 12, 13, 14 on an electronic memory and is executed by an electronic computer.

The invention claimed is:

1. A method for operating a bus system having a plurality of stations connected thereto, the method comprising:
transmitting at least one message via the bus system from at least one station connected to the bus system, wherein each station connected to the bus system uses at least one identifier, the at least one identifier being for use exclusively by the station, wherein each message transmitted on the bus includes an identifier field in which one of the at least one identifiers exclusively used by the station is placed;
receiving each message transmitted via the bus system at a first station connected to the bus system;
reading at least the identifier field of each of the received messages at the first station;
comparing the identifier in the identifier field of each of the received messages to the identifiers being for use exclusively by the first station;
transmitting an error message from the first station in response to the identifier of any of the received messages matching one of the identifiers being for use exclusively by the first station; and
determining from the identifier of a received message whether the received message is relevant to first station in response to the identifier in the received message not matching one of the identifiers being for use exclusively by the first station.

2. The method of claim 1, wherein the first station includes a plurality of identifiers, each identifier in the plurality being for use exclusively by the first station.

3. The method of claim 1, wherein the first station receives messages via the bus system only when the first station is not transmitting messages via the bus system.

4. The method of claim 1, wherein each message transmitted via the bus system includes an identifier only for the station transmitting the message.

5. The method of claim 1, wherein the bus system is a controller area network (CAN) bus system.

6. A non-transitory, computer-readable storage medium including programmed instructions configured to be executed by a processor and for causing the processor to carry out a method of operating a bus system having a plurality of stations connected thereto, the method comprising:
transmitting at least one message via the bus system from at least one station connected to the bus system, wherein each station connected to the bus system uses at least one identifier, the at least one identifier being for use exclusively by the station, wherein each message transmitted on the bus includes an identifier field in which one of the at least one identifiers for use exclusively by the station is placed;
receiving each message transmitted via the bus system at a first station connected to the bus system;
reading at least the identifier field of each of the received messages at the first station;
comparing the identifier in the identifier field of each of the received messages to the identifiers being for use exclusively by the first station;
transmitting an error message from the first station in response to the identifier of any of the received messages matching one of the identifiers being for use exclusively by the first station; and
determining from the identifier of a received message whether the received message is relevant to the first station in response to the identifier in the received message not matching one of the identifiers being for use exclusively by the first station.

7. A computer comprising:
a processor configured to execute programmed instructions; and
a memory including programmed instructions configured to be executed by the processor and for causing the processor to carry out a method of operating a bus system having a plurality of stations connected thereto, the method comprising:
transmitting at least one message via the bus system from at least one station connected to the bus system, wherein each station connected to the bus system at least one identifier, the at least one identifier being for use exclusively by the station, wherein each message transmitted on the bus includes an identifier field in which one of the at least one identifiers for use exclusively by the station is placed;
receiving each message transmitted via the bus system at a first station connected to the bus system;
reading at least the identifier field of each of the received messages at the first station;
comparing the identifier in the identifier field of each of the received messages to the identifiers being for use exclusively by the first station;
transmitting an error message from the first station in response to the identifier of any of the received messages matching one of the identifiers being for use exclusively by the first station; and determining from the identifier of a received message whether the received message is relevant to the first station in response to the identifier in the received message not matching one of the identifiers being for use exclusively by the first station.

\* \* \* \* \*